Jan. 8, 1963    D. O. YOE    3,072,443
PNEUMATIC TRACKS
Filed Aug. 3, 1960    2 Sheets-Sheet 1
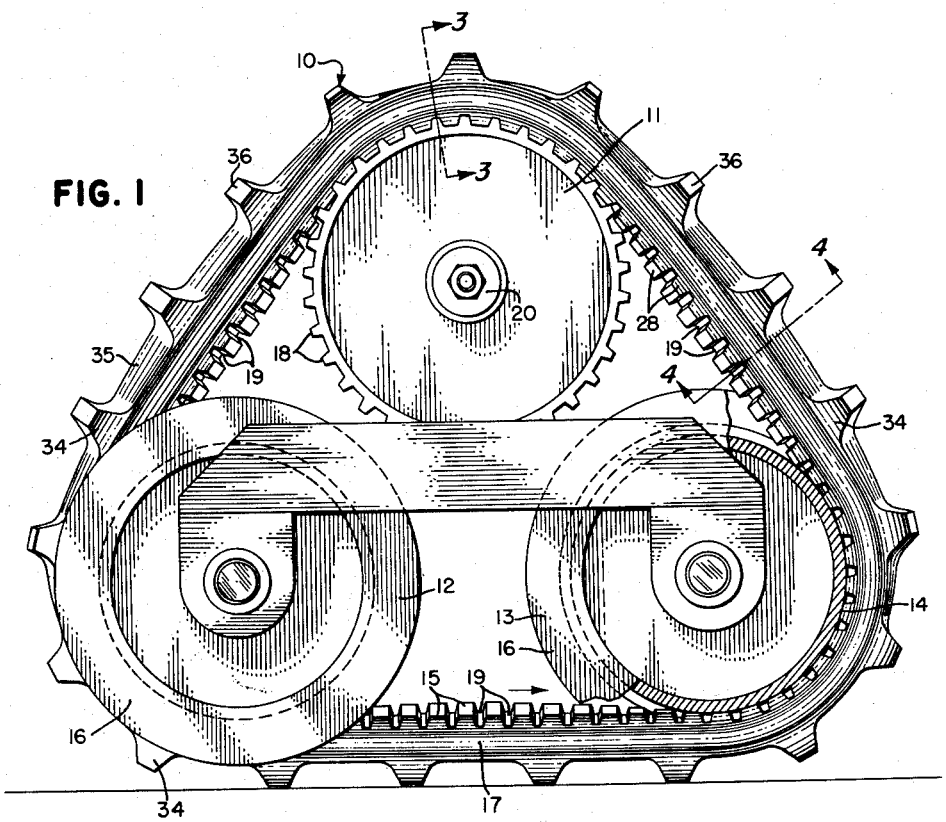
FIG. 1
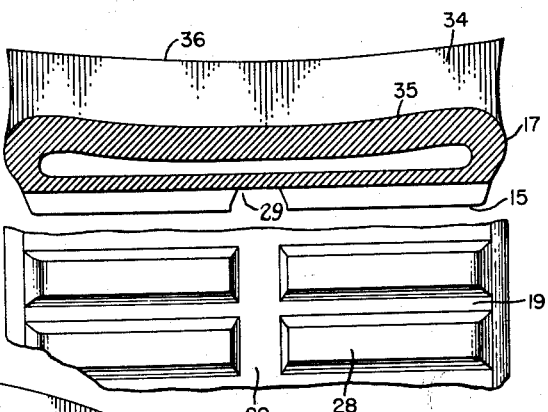
FIG. 3
FIG. 5
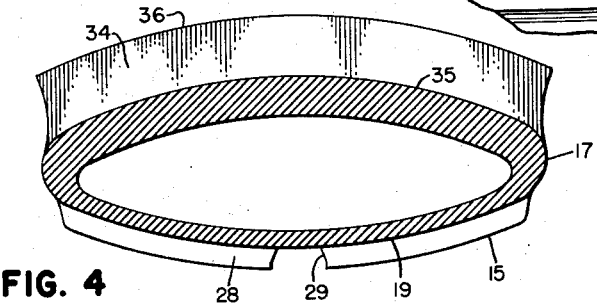
FIG. 4
INVENTOR.
DUANE O. YOE
BY
J.B. Holden
ATTORNEY

INVENTOR.
DUANE O. YOE

United States Patent Office 3,072,443
Patented Jan. 8, 1963

3,072,443
PNEUMATIC TRACKS
Duane O. Yoe, Akron, Ohio, assignor to The Goodyear Tire & Rubber Company, Akron, Ohio, a corporation of Ohio
Filed Aug. 3, 1960, Ser. No. 47,304
3 Claims. (Cl. 305—34)

This invention relates to a pneumatic track for use with track laying vehicles in which power is transmitted from a drive shaft to the radial inner surface of the track.

An object of the invention is to provide a pneumatic track of the character described having an extremely low ratio of cross sectional height to cross sectional width in which the rolling resistance and heat build-up is extremely low and the wrinkling of the sidewall is held to a minimum so that the tire will give exceptional service life.

Another object of the invention is to provide a pneumatic track construction of the character described having high lateral stability so as to keep the track properly entrained about the supporting and driving wheels.

Another object of the invention is to provide a pneumatic track of the character described in which the radial inner surface is provided with transverse lugs meshing with a driving spindle and having a construction whereby the lugs automatically are cleaned of any debris lodging therein.

Other objects and advantages of the present invention will become apparent from the following description when read in conjunction with the accompanying drawings, in which:

FIG. 1 is an elevational view of the pneumatic track mounted on a wheel assembly;

FIG. 3 is a cross sectional view taken along the lines 3—3 of FIG. 1;

FIG. 4 is a cross sectional view taken along the lines 4—4 of FIG. 1;

FIG. 5 is a partial plan view of the base or wheel engaging portion of the track.

Figure 2:
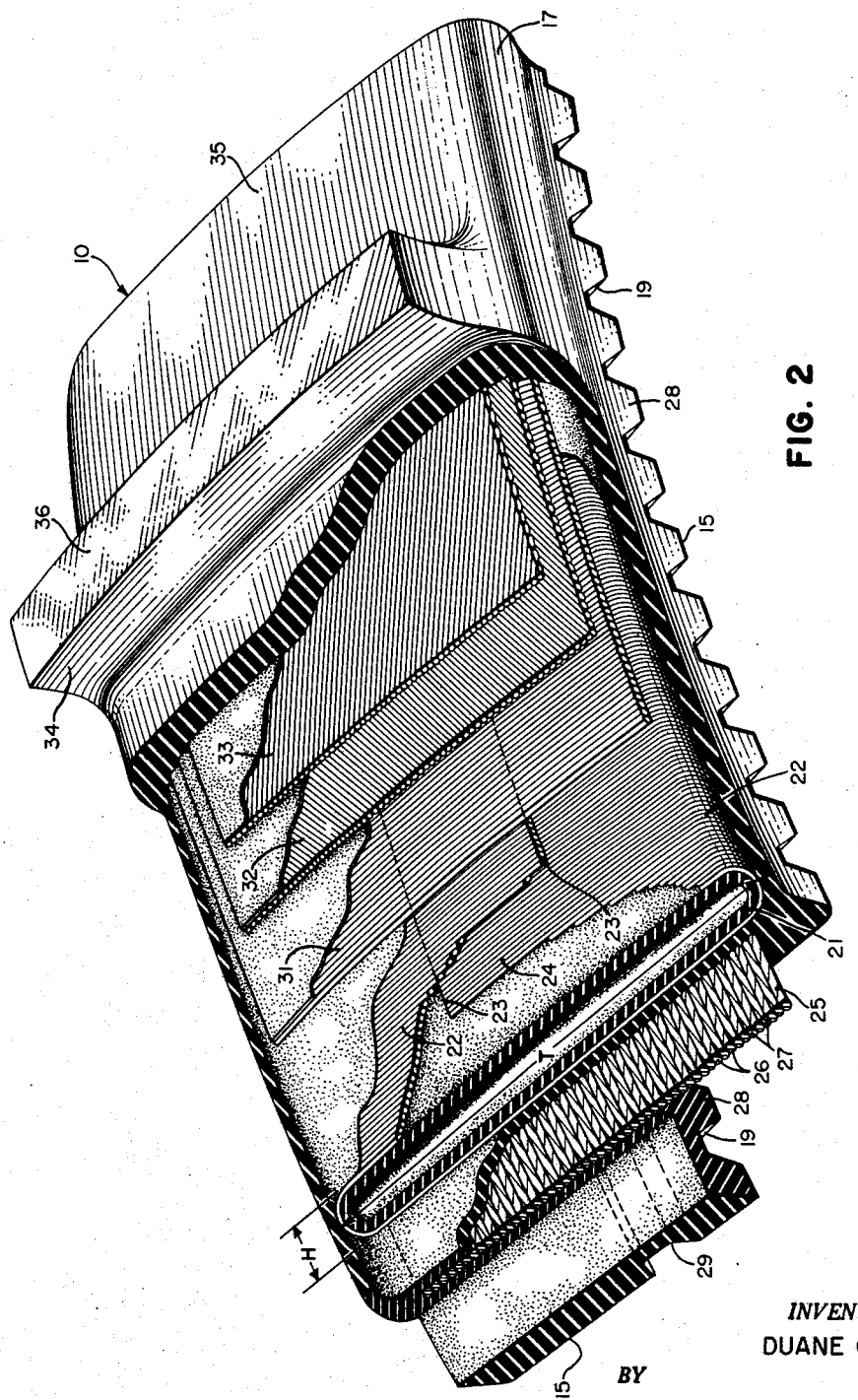
FIG. 2 is an isometric view of the track with parts broken away and shown in cross section showing the internal construction of the track.

Referring to the drawings and in particular to FIG. 1, the pneumatic track generally referred to by numeral 10 is constructed and designed to track around three wheels or spindles 11, 12, and 13. The spindles 12 and 13 are provided with a flat axially extending surface 14 upon which the base 15 of the track 10 engages and with radially extending flanges 16 which engage the sidewall area 17 of the track 10. The spindle 11 is provided with a plurality of transverse lugs 18 which mesh with complementary shaped grooves 19 located in the base 15 of the track 10 whereby power from the axle 20 is transmitted through the spindle 11 and lugs 18 to the base 15 of the track.

As shown in FIG. 2, the pneumatic track 10 is in the form of an endless pneumatic belt of generally flat shape in cross section and constructed so as to provide an extremely low profile shape when inflated through a suitable valve. As shown in FIG. 2, a single chambered annular tube of rubber 21 is wrapped with a ply 22 of cord fabric in which the cords extend at substantially 90° relative to the longitudinal axis of the tube 21. The ply 22 completely encircles the tube 21 and the edges 23 thereof terminate in the crown area 24 and overlap each other for a substantial distance in the crown area. At least one ply 25 of substantially inextensible, flexible, reinforcing fabric is embedded in the base portion 15 to render the base substantially inextensible longitudinally thereof. Preferably, the ply 25 is made of wire cable wound circumferentially about the complete circumferential length of the base 15. In order to increase the lateral stability of the track so that it will track longitudinally of and remain aligned with the spindles 11, 12, and 13, the individual cords 26 and 27 are preferably made of wire in which two strands are simultaneously wound in side by side relationship from one edge of the ply 25 to the opposite edge thereof. The two adjacent strands of wire 26 and 27 are twisted or cabled in opposite directions as clearly shown in FIG. 2. For example, the wire 26 may have an S twist and the adjacent wire 27 would have a Z twist so that any tendency of the ply 25 to cause the base 19 to track in a direction other than parallel to the longitudinal axis of the driving wheels will be eliminated.

As shown in FIGS. 3 and 5 of the drawings, the base 15 of the track is provided with grooves 19 formed by lugs 28 extending at right angles across the base. As previously indicated, a driving spindle 11 is provided with transverse lugs 18 which mesh with the intervening grooves 19 of the base 15. The base 15 is also provided with a centrally located groove 29 into which a rib on the spindle 11 tracks but a rib may be substituted for the groove 29 which would track in a groove on the spindle.

In order to provide minimum rolling resistance and heat build up of the track 10, the track is cured with an extremely low profile, as shown in FIG. 1, which is also assumed at normal inflation pressures. It is critical to this invention that the distance H measured between the radial ply 22 at the crown area 24 and at the base 19 be at a minimum relative to the distance T as measured between the radial ply 22 at one sidewall 17 to the other, and preferably, the ratio is between 8 to 16 or, in other words, the distance T is 8 to 16 times greater than the distance H. Furthermore, it is critical to this invention that the track 10 be substantially inextensible both longitudinally and transversely in the crown area 24 thereof as well as the base 15. In order to provide such inextensibility in the crown the track is provided with at least a pair of breaker plies and preferably three breaker plies 31, 32 and 33, each made of flexible inextensible wire or fabric cord in which the cord in each ply runs in a parallel direction but the cords in adjacent plies are at cross angles to each other. Preferably, the breaker 31 has cords extending at 90° relative to the longitudinal axis of the track whereas the cords of the breakers 32 and 33 are cross angled to each other and extend at a relatively low angle, for example 25° to 15°, relative to the said axis. Furthermore, the radially outer surface of the track 10 is provided with ground-engaging spaced tread lugs 34 which extend continuously across the tread 35 at right angles to the longitudinal axis of the track which aids in maintaining inextensibility of the crown.

As shown in FIGS. 1, 3, and 4 of the drawings, the sectional profile of the track changes from that shown in FIG. 3 of the drawings to that shown in FIG. 4 of the drawings as any given section of the track moves from a postion immediately over the driving spindle 11 to a position intermediate of the driving spindle 11 and the spindles 12 and 13. As the track passes over the driving spindle 11 the surface 36 of the tread lugs 34 is substantially flat or slightly concave and the shape of the air chamber is substantially flattened. As the track moves to a position intermediate of the driving wheel 11 and one of the spindles 12 or 13 the cross sectional shape of the track is such that the surface 36 of the lugs 34 assumes a very decided convex shape as shown in FIG. 4 and the sectional shape of the air chamber becomes substantially elliptical. This change in the cross sectional shape as described results from the construction of the track 10 and continuously forces mud and other debris out of engagement with the grooves 29 and 19 to prevent fouling of the driving teeth 18 of the wheel 11 with the driving lugs 28.

Furthermore, it is seen that as any section of the track moves toward the driving wheel or spindle 11, the circumferential groove 29 initially engages the circumferential rib on the spindle before the transverse grooves 19 mesh with the ribs 18 which positively positions the track centrally of the wheel 11 and continuously holds the track in proper alignment therewith.

While certain representative embodiments and details have been shown for the purpose of illustrating the invention, it will be apparent to those skilled in the art that various changes and modifications may be made therein without departing from the spirit or scope of the invention.

What is claimed is:

1. An inflatable track for use with at least two wheels, comprising a single annular rubber tube positioned within and integrally secured to a casing, said tube and casing forming a single air chamber, said tube and casing being endless in cross section and endless longitudinally, the ratio of the sectional width of said casing to the sectional height of said casing being between 8 and 16, said casing having rubber tread, sidewall and base portions integrally formed thereon, said casing having reinforcing cords extending continuously through the base portion and around the transverse cross section of said casing at 90° relative to the axis thereof, said casing having at least two breaker plies of parallel wire cords cross angled relative to each other and positioned between said reinforcing cords and said tread, said wire cord breaker plies being coextensive longitudinally and transversely with said tread, and substantially inextensible cords in said base portion extending in a substantially longitudinal direction to render the base portion substantially inextensible.

2. A pneumatic track as claimed in claim 1 in which the base of said track is provided with driving lugs extending at right angles to the longitudinal axis of said casing, said lugs being spaced apart at the central portion of said base by a longitudinally extending groove.

3. A pneumatic track as claimed in claim 1 in which said substantially inextensible cords in said base extend in a plurality of turns circumferentially in a longitudinal direction relative to said base, the adjacent turns of said cords being twisted in opposite directions.

References Cited in the file of this patent

UNITED STATES PATENTS

| | | |
|---|---|---|
| 1,986,865 | Tschappat | Jan. 8, 1935 |
| 2,337,074 | Walker | Dec. 21, 1943 |
| 2,365,279 | Kraft | Dec. 19, 1944 |
| 2,493,614 | Bourdon | Jan. 3, 1950 |
| 2,621,085 | Bonmartini | Dec. 9, 1952 |
| 2,748,827 | Kerr et al. | June 5, 1956 |

FOREIGN PATENTS

| | | |
|---|---|---|
| 143,398 | Australia | Apr. 28, 1949 |